United States Patent
Wang et al.

(10) Patent No.: US 9,509,020 B1
(45) Date of Patent: Nov. 29, 2016

(54) VOLUMETRIC BATTERY HEALTH SENSOR

(71) Applicant: Amazon Technologies, Inc., Reno, NV (US)

(72) Inventors: Libo Wang, Zhongshan (CN); Jianbin Shen, Dongguan (CN); Jasmin B. Farshi, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 230 days.

(21) Appl. No.: 14/228,141

(22) Filed: Mar. 27, 2014

(51) Int. Cl.
 *G08B 21/00* (2006.01)
 *H01M 10/48* (2006.01)
 *G08B 21/18* (2006.01)
 *H01M 2/10* (2006.01)

(52) U.S. Cl.
 CPC ............ *H01M 10/48* (2013.01); *G08B 21/182* (2013.01); *H01M 2/1016* (2013.01)

(58) Field of Classification Search
 CPC .. H01M 2/10; H01M 2/1005; H01M 2/1016; H01M 2/1094; H01M 10/48; G08B 21/182
 See application file for complete search history.

(56) References Cited

U.S. PATENT DOCUMENTS

| | | | | |
|---|---|---|---|---|
| 5,488,282 | A * | 1/1996 | Hayden | B64G 1/425 136/293 |
| 7,479,894 | B2 * | 1/2009 | Song | H02H 7/18 340/636.1 |
| 8,557,418 | B2 * | 10/2013 | Byun | H01M 2/0237 429/156 |
| 9,147,872 | B2 * | 9/2015 | Lim | H01M 2/34 |
| 2007/0054157 | A1 * | 3/2007 | Ryu | H01M 10/42 429/7 |
| 2010/0062322 | A1 * | 3/2010 | Murata | H01M 2/1016 429/82 |
| 2010/0068607 | A1 * | 3/2010 | Spare | H01M 10/48 429/90 |
| 2010/0300601 | A1 * | 12/2010 | Nakanishi | H01M 2/1077 156/64 |
| 2012/0133521 | A1 * | 5/2012 | Rothkopf | G01R 31/024 340/636.1 |
| 2015/0207133 | A1 * | 7/2015 | Holl | H01M 2/30 429/61 |

* cited by examiner

*Primary Examiner* — Ryan Sherwin
(74) *Attorney, Agent, or Firm* — Weaver Austin Villeneuve & Sampson LLP

(57) ABSTRACT

Techniques, apparatuses, and systems for monitoring battery pack health based on detection of dimensional changes in the battery pack are provided. A sensor may be configured to detect dimensional change in a battery pack in at least one dimension beyond a first threshold amount. Detection of such dimensional change may cause a notification to be provided that indicates that the battery pack is potentially degraded.

16 Claims, 7 Drawing Sheets

VOLUMETRIC BATTERY HEALTH SENSOR

BACKGROUND

Modern portable electronic devices may have a large number of subsystems that rapidly drain batteries during normal use, e.g., have a battery life on the order of hours or days during normal usage. As a result, most modern portable electronic devices utilize some form of rechargeable battery. Such batteries are offered in a variety of form factors, such as prismatic, pouch, button, and cylindrical form factors, and may utilize any of a variety of chemistries, such as nickel metal hydride (NiMH) or lithium ion (Li). Rechargeable batteries typically have multiple cells arranged in a layered fashion. If a short develops across two or more of the cells, this may cause battery performance to degrade and eventually cause battery failure. Such failures may, in extreme circumstances, be catastrophic and involve fire or explosion. Such short circuits may be caused by mechanical insult (such as may be caused by denting the battery cover of an electronic device) or manufacturing defects such as poor sealing leading to moisture or metal contamination. Other potential sources of battery pack degradation may include overcharging, overdischarging/excessive discharging, or improper design.

BRIEF DESCRIPTION OF DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Described herein are various techniques and systems for detecting potential battery degradation or imminent failure by monitoring the battery for dimensional change beyond a first threshold amount in at least one dimension. When rechargeable batteries, e.g., Li batteries, begin to degrade or fail, the materials within the batteries undergo chemical reactions that cause the batteries to swell in size. Such swelling often exacerbates the degradation since it may cause battery cells within the battery to be pressed into conductive contact with one another, causing short circuits or other behaviors that further degrade the battery pack. The present inventors have realized that this swelling behavior may be used as an indicator of when a battery has started to degrade, and that monitoring for such behavior may allow a potential battery failure to be electronically detected using a sensor that is capable of detecting at least some of the dimensional changes associated with the swelling behavior. The techniques and technologies discussed herein may be applied to either single battery cells or to battery cells that are part of a multi-cell battery pack. Furthermore, the techniques and technologies described herein may also be applied to multi-cell battery packs as a whole, e.g., when a battery or battery cell in a battery pack swells, the entire battery pack may also change in size, and such dimensional change may be detected as outlined herein and used as an indicator of a failure within the battery pack. As used herein, the term "battery pack" is to be understood to generally refer to single-cell batteries, multi-cell batteries, or multi- and single-battery battery packs.

Figure 1A:
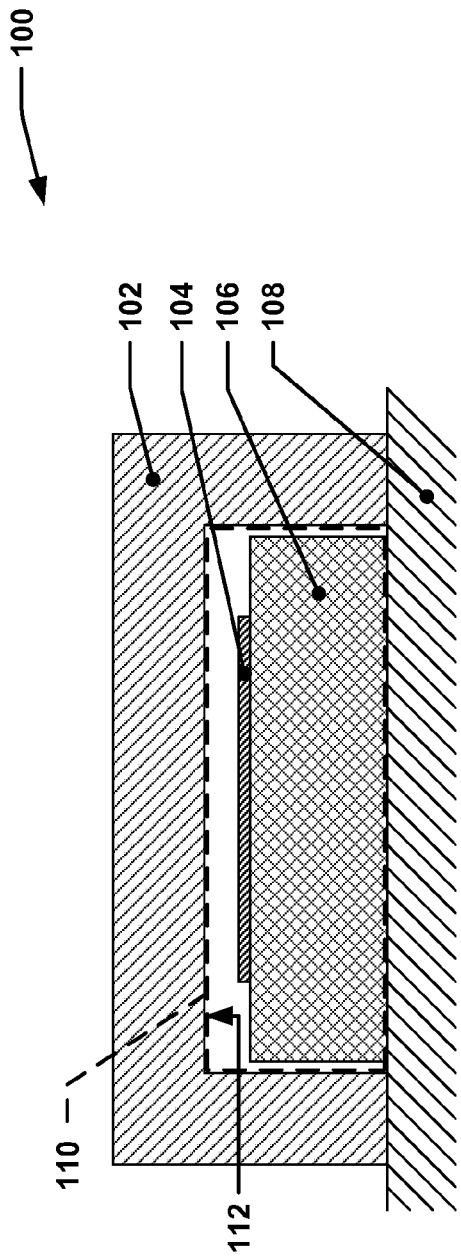
FIG. 1A depicts a simplified representation of an example apparatus featuring a battery pack and a sensor configured to detect potential battery pack degradation or imminent failure by indicating when dimensional change beyond a first threshold amount in the battery pack occurs.

FIG. 1A depicts a simplified representation of an example apparatus featuring a battery pack and a sensor configured to detect potential battery pack degradation or imminent failure by indicating when dimensional change beyond a first threshold amount in the battery pack occurs. The apparatus 100, for example, a consumer electronic device such as a cellphone, tablet, or laptop, may have an interior compartment 110 that is, for example, defined by various components such as a housing 108 and a lid 102. A battery pack 106, including a battery (not shown), may be housed within the interior compartment 110. As shown, a gap exists between a first interior surface 112 of the lid 102 and the battery pack 106. A sensor 104, e.g., a force-sensing resistor, contact switch, a strain gauge, or other sensor, may be positioned in the gap. The sensor 104 may, in some implementations, be positioned in the gap by being coupled with a surface of the battery pack 106 or with the first interior surface 112 of the lid 102 (or another interior surface defining the interior compartment 110). In some other implementations, however, the sensor may not be coupled with such components but may instead be allowed to "float" within the gap (cables/wires/conductors for communicating with the sensor may, in such implementations, still be coupled with the battery pack 106 or some other component, of course, but the sensor itself may be described as floating between components without being, for example, affixed to any particular component). In such implementations, the sensor may be largely constrained from excess movement by the close proximity of the battery pack 106 and the lid 102 to one another, as well by the sensor's own structure, e.g., such as conductive traces that connect the sensor 104 to other components within the apparatus. A non-affixed sensor 104 may be used when it is undesirable to include the sensor 104 as a component that is permanently mounted to the battery pack 106 (thus requiring that the sensor 104 be discarded when the battery pack 106 is replaced) or the lid 102 (thus presenting an increased risk of possible damage to the sensor 104 when consumers remove the lid 102). The sensor 104 may be communicatively connected with a controller (not shown) that monitors output from the sensor and that may provide one or more notifications or signals in response to such output.

Figure 1B:
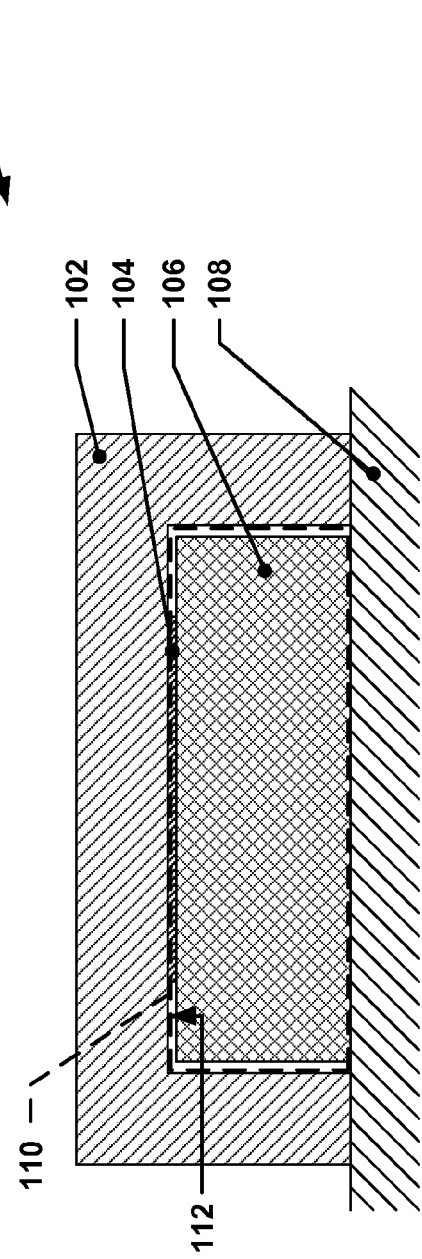
FIG. 1B depicts the simplified representation of the example apparatus of FIG. 1A with the battery pack in an expanded configuration.

FIG. 1B depicts the simplified representation of the example apparatus of FIG. 1A with the battery pack in a swollen condition (e.g., an increase in volumetric size of the battery pack or an increase of at least one physical dimension of the battery pack, for example, an increase in thickness, width, length, or a combination of such parameters). The physical size of battery pack 106 has increased to an extent that the gap that previously existed between the battery pack 106 and the first interior surface 112 is reduced, bringing the sensor 104 into compressive contact with the first interior surface 112. The sensor 104 may produce an output signal indicative of such compressive contact, which may then be monitored by the controller and, if analysis of the signal indicates it appropriate, cause the apparatus to provide one or more notifications that the battery pack 106 is experiencing degradation or that some form of maintenance should be performed. For example and in one embodiment, an output signal of sensor 104 provides an indication that at least one physical dimension of the battery pack 106 is increasing and the condition of the battery pack should be checked. Although not shown, one or more sensors may be placed on other surfaces of the battery pack 106 so that a change in one or more other physical dimensions may be monitored and detected. In some implementations, changes in multiple different dimensions of the battery pack may be monitored using a different sensor 104 for each different dimension. For example, a first sensor 104 may be used to detect an increase in thickness in the battery pack, a second sensor 104 may be used to detect an increase in width in the battery pack, and a third sensor 104 may be used to detect an increase in length of the battery pack. Other implementations may use more or fewer sensors 104, as well as different sensor technologies, to detect such changes in dimension. Such additional sensors may be mounted in different locations, e.g., one sensor 104 may be mounted on the top or bottom side of the battery pack, and another sensor 104 may be mounted on a side orthogonal to the top or bottom side. Other placements of the sensor(s) 104 are possible as well and considered within the scope of this disclosure.

In the example of FIGS. 1A and 1B, an initial gap between the first interior surface and the battery pack reflecting a normal or acceptable condition may act, in effect, as the first threshold amount in at least one dimension for which the expansion of the battery pack 106 is monitored. If needed, the first interior surface may be provided by a protrusion from a larger interior surface towards the battery pack. For example, a battery cover may have a surface that faces the battery pack during normal use. This surface may form an interior surface of the enclosure around the battery pack, and may be offset from the battery pack by a gap (a distance greater than zero). The gap may allow a certain amount of battery pack expansion to occur before compression of the sensor 104 caused by reducing the distance between the interior surface and the battery pack. If it is desired to generate a notification regarding battery pack degradation in response to battery pack expansion that is less than the above-described gap, then it may, in some implementations, be desirable to include a protrusion from the interior surface towards the battery pack that creates a second, smaller gap. The second, smaller gap may correlate to the gap between a protrusion interior surface or "first interior surface" and the battery pack. As the battery pack becomes larger in physical size, the protrusion interior surface becomes closer to the battery pack and the sensor. Upon contact of the protrusion interior surface or the battery pack with the sensor, the sensor may be compressed and a notification regarding battery degradation may be generated.

Figure 2A:
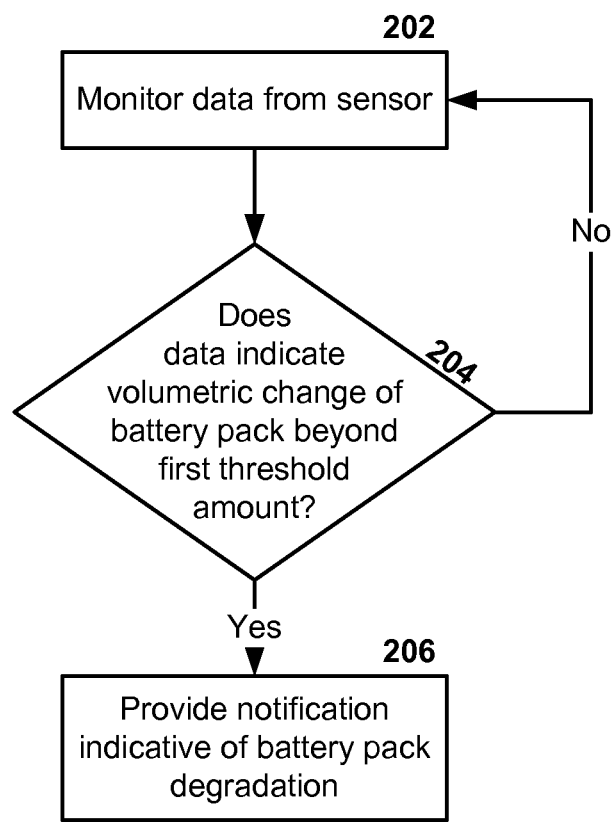
FIG. 2A depicts a high-level flow diagram for a technique of monitoring a sensor configured to detect potential battery pack degradation or imminent failure by indicating when dimensional change beyond a first threshold amount in the battery pack occurs.

The controller that is connected to the sensor may perform at least two primary functions related to monitoring battery health. FIG. 2A depicts a high-level flow diagram for a technique of monitoring a sensor configured to detect potential battery pack degradation or imminent failure by indicating when dimensional change beyond a first threshold amount in the battery pack occurs; these two functions are represented in FIG. 2A.

In block 202, data from an output signal of the sensor in an apparatus may be monitored. Such monitoring may be continuous or may be intermittent, depending on the sensor type, desired response time, power requirements for the apparatus, and other factors. At various intervals, a determination may be made in block 204 as to whether the output signal indicates that battery health has declined. For example, as soon as the output signal indicates that the battery pack has experienced dimensional change beyond the first threshold amount in at least one direction, the controller may determine that the battery pack has degraded and may proceed to perform the second function (block 206), which is to provide some notification or take some other action associated with such a determination. If the output signal indicates that the battery pack has not experienced a dimensional change, the technique may return to block 202 for further monitoring of the data from the sensor.

In some implementations, the controller may be configured to perform further analysis on the sensor data before determining whether or not the battery pack has experienced degradation. For example, to avoid the possibility of a momentary load triggering a determination that the battery pack has degraded, such as may be generated if the apparatus is dropped and lands on the lid covering the battery pack, thus causing the lid to flex momentarily and contact the sensor, the data from the sensor may be examined over a period of time to determine if the contact is transient or sustained. Contact that is sustained over a prolonged period of time, e.g., several minutes, hours, or days, is much more likely to indicate battery pack degradation than momentary contact, and the technique may, in some implementations, only generate a notification or take other action in response to some prolonged excursion beyond the first threshold amount. For example and in one embodiment, a battery pack degradation notice may be provided to a user if the output signal exceeds a threshold level for a defined period of time (e.g. 30 seconds, 1 day, etc.).

As mentioned above, the second function of the controller is to provide some form of notification or take some action in response to a determination that the battery pack has degraded. For example, the controller may provide a notification signal to the apparatus that indicates that the battery pack has experienced potential degradation. Such a notification signal may then cause the apparatus to provide an external notification in a number of ways. For example, a processor or processors of the apparatus may cause a visual, auditory, or tactile indicator to provide an indication to a user of the apparatus that there is an issue with the battery pack. For example, the processor(s) of the apparatus may cause a display on the apparatus to display content indicating that the battery pack is compromised, content indicating that the battery pack is degrading, content indicating that the battery pack is unsafe, content indicating that the battery pack may be unsafe, content indicating that the battery pack needs to be replaced, content indicating an error code, and/or content indicating that service for the apparatus should be sought.

Alternatively or additionally, the processor(s) of the apparatus may cause a notification signal to be sent to a remote device, e.g., to a server maintained by the manufacturer of the device. This notification signal may be sent using a communication element of the apparatus 100 such as a wired or wireless communication path. This notification to the remote device may allow a third party to evaluate the notification and, if necessary, contact the owner of the apparatus (if the notification is provided in association with information identifying the apparatus or the owner of the apparatus).

In some implementations, the controller may be configured to prevent further charging of the battery pack, e.g., by temporarily disabling a charging circuit. This may serve a two-fold purpose. First, it may prevent the battery pack from storing further energy within it, thus reducing the potential for catastrophic failure such as fire or explosion. Second, it may force the user to replace the battery pack since the apparatus will not be functional without a chargeable battery pack.

Figure 2B:
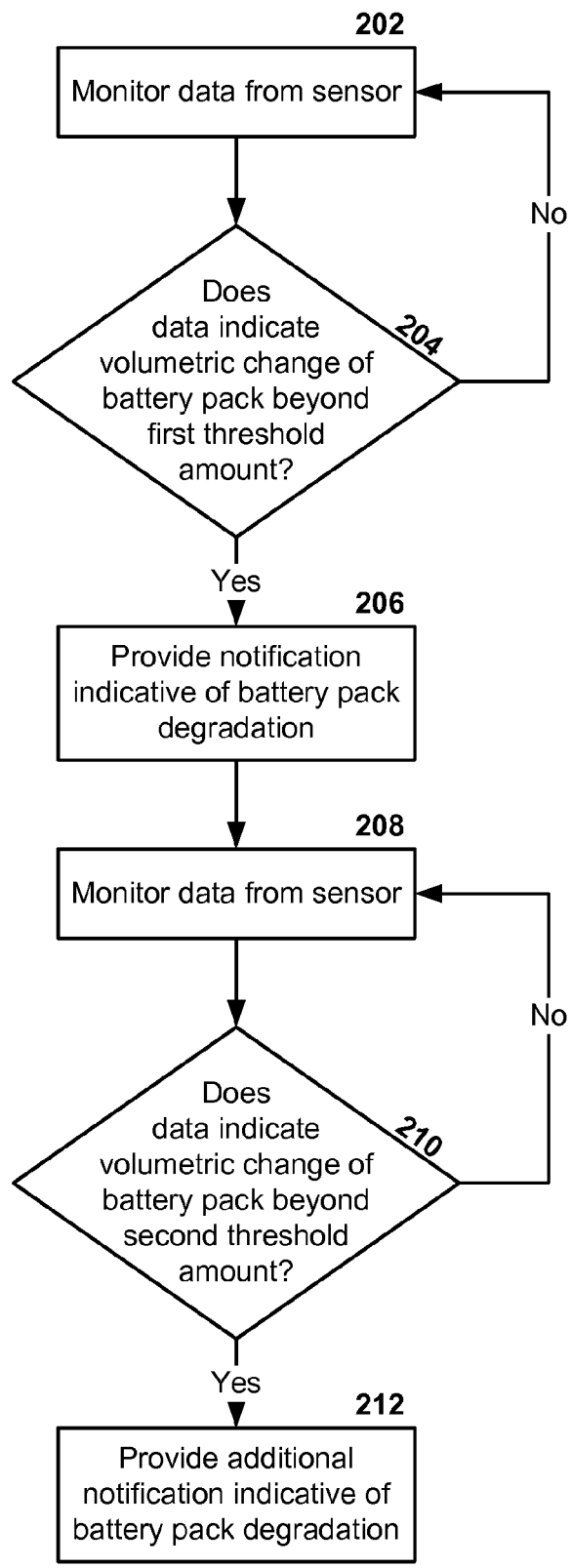
FIG. 2B depicts a high-level flow diagram for another technique of monitoring a sensor configured to detect potential battery pack degradation or imminent failure by indicating when dimensional change beyond a first threshold amount in the battery pack occurs.

While the technique of FIG. 2A provides a technique for providing a notification in response to receiving sensor data that indicates battery pack degradation, other techniques, such as the one illustrated in FIG. 2B, may provide multiple levels of notification depending on the sensor data.

For example, in block 202, data from a sensor configured to detect when a battery pack has experienced volumetric change beyond a first threshold amount in at least one dimension may be monitored. Periodically, the data from the sensor may be analyzed in block 204 to determine if the data indicates that the battery pack has expanded beyond a first threshold amount in at least one dimension. If not, then the technique may return to block 202. If so, then the technique may proceed to block 206, where a notification, e.g., a first notification, that is indicative of the degradation of the battery pack may be provided (or other action performed) responsive to the determination in block 204.

After providing the notification in block 206, the technique may proceed to block 208, in which the data from the sensor may be monitored again. Block 210 may then be periodically performed, and if it is determined in block 210 that the sensor data indicates that the battery pack has expanded beyond a second threshold amount in at least one dimension, then the technique may proceed to block 212, in which a second notification may be provided (or other action taken). If not, then the technique may return to block 208. Such a technique may be augmented using further threshold amounts and further notifications/actions taken as needed in response to those further threshold amounts being exceeded.

It is to be understood that the apparent delineation between the controller and the apparatus is for discussion purposes only—the apparatus may act, in effect, as the controller, and the same processor(s) may provide all of the above functionality. In some implementations, the controller may operate independently of the processor(s) of the apparatus. For example, the controller may be part of the battery pack and may have its own notification system, e.g., a warning light that illuminates (or an audio device that beeps) when the controller determines that the battery pack is potentially degraded. In some implementations, the controller may be provided as part of a battery pack protection circuit module (PCM). All of these implementations, as well as other configurations not discussed herein but that still provide the general functionality described herein are also to be understood as being within the scope of this disclosure.

The techniques discussed herein may be implemented using, as discussed above, various forms of controllers or other hardware capable of monitoring the data from the sensor and of providing the notifications or performing the actions desired responsive to the data from the sensor indicating that the first (or additional) thresholds for dimensional change in the battery pack have been met or exceeded. Such hardware may include one or more processors that are communicatively connected with a memory configured to store computer-executable instructions for controlling the one or more processors to perform the various operations associated with the relevant technique. In some implementations, the techniques may be implemented purely in hardware, e.g., a circuit may be constructed to monitor the data from the sensor and then provide the desired notification or take the desired action in respond to the data indicating that the first threshold amount has been met or exceeded. In some implementations, this may take the form of an application-specific integrated circuit (ASIC). In implementations involving software, any suitable programming language may be used, such as JAVA, iOS, Android, C++, etc. Generally speaking, the phrase "control logic" may be used herein to refer to any combination of processors executing computer-executable instructions and hardwired circuits (including purely hardwired circuits) that are configured to provide the functionality described herein. For example, control logic may include a hardwired circuit to pre-process data from a sensor, and may then pass that data to a processor executing software instructions retrieved from a memory communicatively connected with the processor. The processor may then process the sensor data and perform one or more of the functions described herein, e.g., provide a notification of battery pack degradation when the sensor data indicates that the battery pack has expanded beyond a first threshold amount. In some cases, the control logic may simply include a specialized, hardwired circuit that may be constructed such that the circuit produces a particular notification signal, e.g., a positive voltage, when the sensor produces an output signal indicating that the battery pack has expanded beyond a first threshold amount. These implementations are provided by way of example only, and other potential configurations of control logic are also to be understood as being within the scope of this disclosure.

It is to be understood that a variety of sensors 104 may be used. Several suitable sensor types are discussed below, although the concepts and techniques described herein are not limited to such sensors, and other sensors that may provide an indication of volumetric change in a battery pack may be used as well.

One suitable type of sensor is a force-sensing resistor, such as those made by or similar to those made by Interlink Electronics. A force-sensing resistor (FSR) is a generally flat sensor, often less than 0.5 mm thick, that measures force applied to the sensor. An FSR may be used to provide an indication of when a batter pack has expanded sufficiently, e.g., beyond a first threshold amount in at least one dimension, to come into contact with some relatively immovable structure, e.g., a first interior surface of a housing. The battery pack (and FSR) may not normally be in contact with the first interior surface due to a gap between the battery pack and the first interior surface; if the battery pack degrades and expands as a result of the degradation, the battery pack may expand to fill the gap and contact the first interior surface. The resulting contact may cause the FSR to be compressed, and the resulting increase in compressive force may be observed from the data obtained from the FSR. Use of an FSR may also allow the degree of compression to be evaluated. For example, after the initial contact between the battery pack and the first interior surface, the battery pack may continue to swell but be wholly or partially prevented from expanding further by the surrounding enclosure; the compressive forces that prevent such further expansion may be transmitted to the battery pack from the surrounding enclosure through the FSR. Since the magnitude of the compressive forces measured by the FSR generally track with how much the battery pack would have expanded in an unconstrained state, such magnitudes may be used to estimate the progression of battery pack degradation (for example, using the technique discussed with respect to FIG. 2B). This information may be used by the controller to provide further or revised updates as to the battery pack state of health.

For example, upon detection of initial compressive contact, the controller may be configured to alert the owner of the apparatus by displaying a message on a display of the apparatus, e.g., a message stating "WARNING: The battery pack may be degrading and should be replaced. Please contact the manufacturer to obtain a replacement." If the compressive contact force measured by the FSR continues to increase, however, and reaches a second threshold amount, then the controller may be configured to take a different action, e.g., cause a message to be sent to the manufacturer of the apparatus (or to another party) indicating that the battery pack has degraded. While this example only involves two levels of notification, there may be more than two levels of notification, each triggered based on a different level of force sensed by the FSR.

Another suitable type of sensor that may be used is a simple contact switch. For example, two or more conductive traces may be located on the battery pack, each normally conductively isolated from the other. A conductive bridge, which may be located on the lid or a similar structure such that it overlaps with the two or more conductive traces, may come into electrically conductive contact with the conductive traces when the battery pack expands such that the conductive traces are pushed into the conductive bridge. This may close the circuit between the conductive traces, and the resulting closed circuit may be used as an indicator that the battery pack has degraded. If the lid itself is made of an electrically conductive material, the lid itself may serve as the conductive bridge. Alternatively, a conductive material may be bonded to, deposited on, or otherwise attached to the lid. In some implementations, the positions of the conductive traces and the conductive bridge may be reversed, i.e., the conductive bridge may be located on the battery pack and the conductive traces on the lid. The conductive traces may, for example, simply be two linear traces that meet, but do not touch, in the middle of an exterior surface of the battery pack. The conductive bridge in such an example, may be a small patch of conductive material that overlaps the ends of both linear traces where they meet (but do not touch). When pressed into contact with the conductive traces, the conductive bridge allows current to flow through the conductive traces. More complex examples may involve two or more interleaved "combs" of conductive traces and a conductive bridge that spans across the entire interleaved area of the conductive traces—contact between the conductive bridge and any "tines" from the two or more conductive trace combs may cause the circuit to close and may be used as an indicator of battery pack degradation. While the contact switch sensor is relatively straightforward to implement, it may be difficult to obtain indications of different levels of battery pack expansion/degradation as may be done with an FSR sensor (although this may be accomplished using multiple contact switches that close in response to different amounts of compression/displacement on the part of the battery pack). In some implementations, the contact switch may be provided by a single conductive trace and the conductive bridge may, for example, simply be another conductive trace that may be pressed into contact with the single conductive trace in order to complete a circuit. For example, one of the two traces may be located on an exterior surface of the battery pack and the other trace may be located on an interior surface of a lid forming part of an enclosure for the battery in a device housing, e.g., a cell phone housing. When the battery pack swells, it may cause the two conductive traces to come into contact, thus closing a circuit that may be monitored for an output signal.

A third suitable type of sensor that may be used is a strain gauge (uniaxial or multi-axial). The strain gauge may be affixed to a surface (interior or exterior) of the battery pack to measure the amount of strain experienced by the battery pack. As the battery pack expands, the exterior surfaces of the battery pack will stretch, which may be measured by the strain gauge. This approach has the benefit of being able to detect battery pack degradation without requiring contact between the battery and the first surface. As with the FSR sensor, the strain gauge sensor may allow multiple levels of battery pack expansion/degradation to be determined and corresponding multiple levels of notification to be provided.

Figure 3:
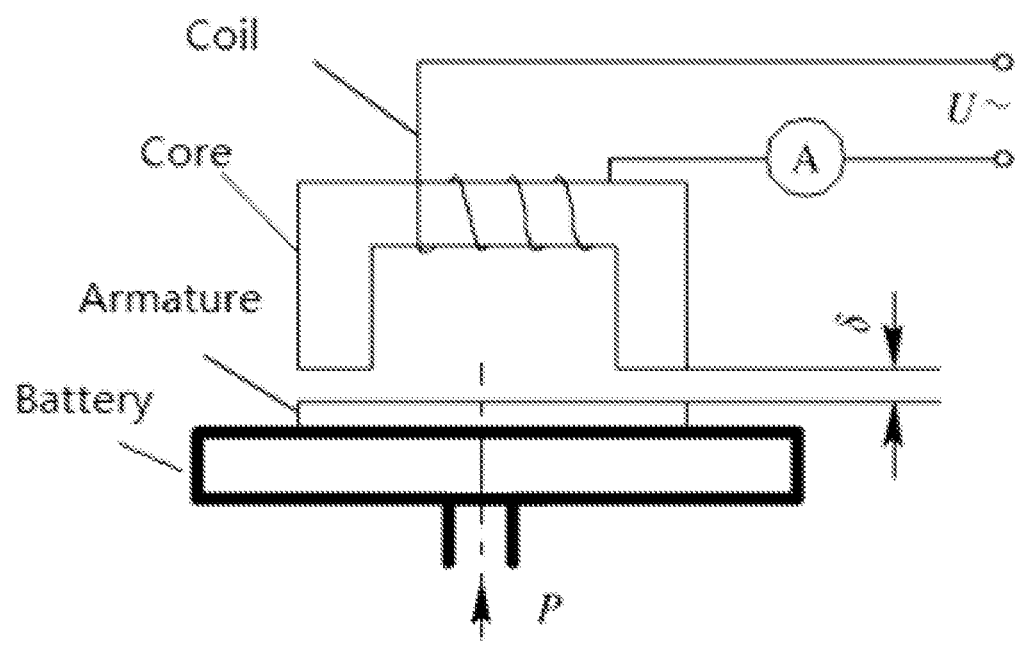
FIG. 3 depicts a schematic of a variable reluctance electromagnetic sensor configuration that may be used to monitor battery pack health.

A fourth suitable type of sensor is a variable reluctance electromagnetic sensor. FIG. 3 depicts a schematic of a variable reluctance electromagnetic sensor configuration that may be used to monitor battery pack health. A current may be passed through a coil wrapped around a core. An armature that is placed on or within a batter pack may be adjacent to the core and separated from the core by a gap δ. If the battery expands, the armature will be moved closer to the core, closing the gap δ and causing the reluctance of the sensor to change (which may be observed as a change in output current and may thus serve as an indicator of dimensional change in the battery pack).

Various other types of sensors in addition to those discussed above may be used if they provide insight as to the dimensional changes experienced by a battery pack during expansion. For example, optical sensor technologies (such as sensors that use optical fibers that may experience a shift in internal reflectance, and thus light transmissivity, when deformed), capacitive technologies (such as sensors that measure a capacitance change caused by a change in gap caused by battery expansion), electromagnetic sensors (such as the reluctance sensor discussed above as well as other electromagnetic sensors), accelerometer-based sensors, piezoelectric sensors, piezoresistive sensors, and other sensor technologies aside from the specific examples described herein may provide sensors that are suitable for such purposes.

It is to be understood that the output signal may be a portion of a signal normally produced by the sensor. For example, an FSR may provide a signal, e.g., a bias voltage, even when the FSR is uncompressed. The signal may, however increase to a voltage higher than the bias voltage when the FSR is compressed due to an increase in at least one dimension of the battery pack due to battery degradation. This higher voltage, which is indicative of battery degradation, may serve as the output signal.

It is to be understood that while the examples provided herein have focused on implementations where the sensor is located between the battery pack and the lid of the enclosure that contains the battery pack, other implementations may feature other configurations. For example, the sensor may be located within the battery pack, e.g., an FSR or strain gauge may be embedded within the battery pack, or located between the battery pack and another surface. The dimensional change in the battery pack may still be registered by such alternately-placed sensors. In some implementations, there may not be an easily-removable lid, and the battery pack may be contained between two halves of the housing with the sensor also located somewhere between the two halves such that expansion of the battery pack is detectable using the sensor. In some implementations, the sensor may be part of (or affixed to) the battery pack, but in other implementations, the sensor may be part of the apparatus. For example, an FSR may be attached to the lid of the battery enclosure of the apparatus so that it is not necessary to replace the FSR when the battery pack is replaced. The techniques outlined herein are readily adaptable to use in such alternate arrangements.

The battery degradation sensors and techniques described herein may be used in any of a variety of battery-powered electronic devices, including cell phones, smartphones, tablet computers, laptops, portable music players, external emergency or auxiliary battery packs (such as may be connected to a cell phone or smartphone in order to provide power in the event that the internal battery is exhausted), power sleeves (such as cell phone cases that include an external auxiliary battery), cameras, and so forth. In some cases, such as with power sleeves, the battery-containing device may be designed to interface with another device that may, in some implementations, provide some of the features described herein. For example, a power sleeve may have a battery pack that is exposed when the power sleeve does not have a smartphone installed inside. When the smartphone is installed in the power sleeve, the battery pack may be covered up by the smartphone. The back side of the smartphone in such an arrangement may provide the first interior surface of a battery enclosure formed by the assembled smartphone and power sleeve.

Figure 4A:
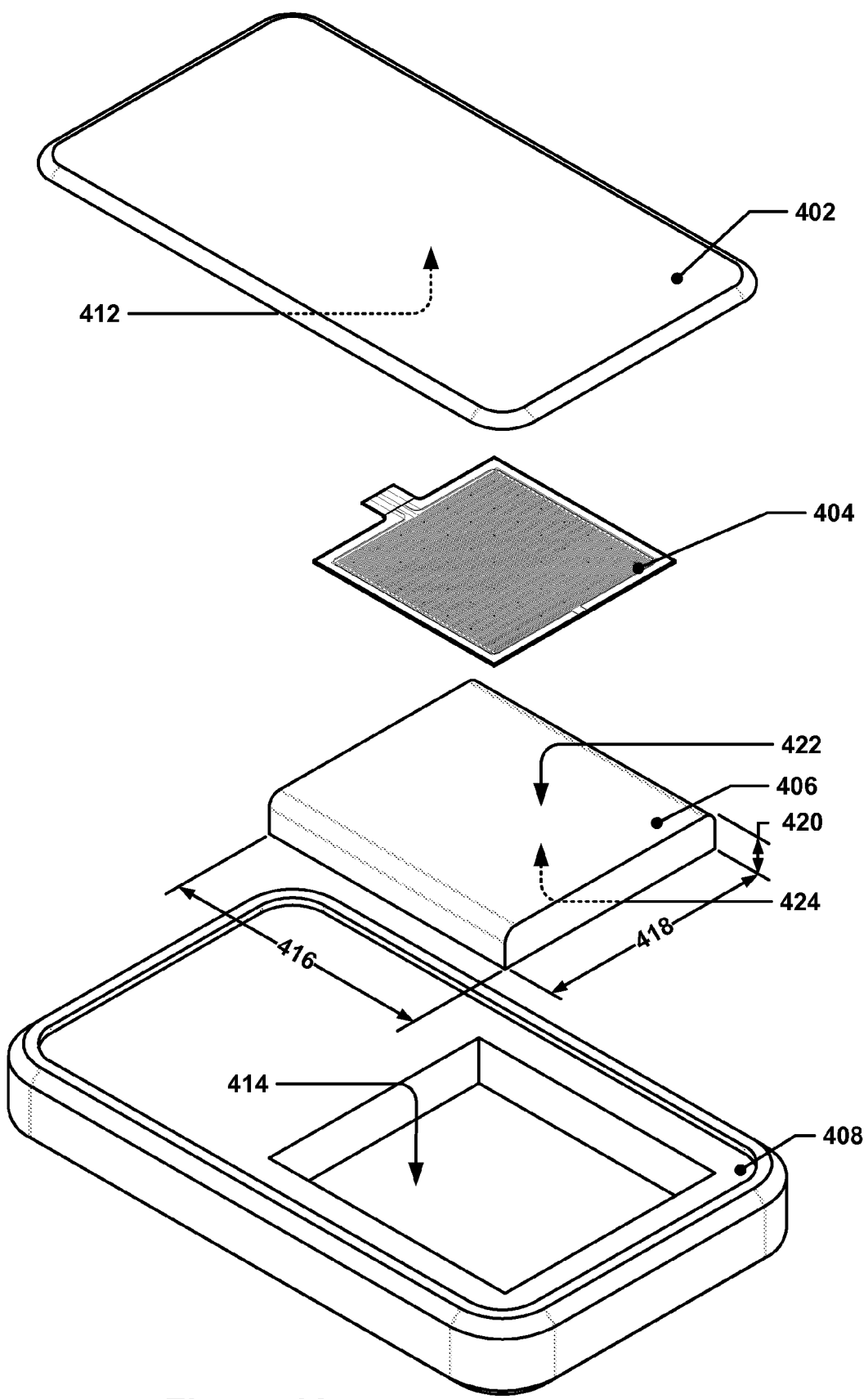
FIG. 4A depicts an isometric exploded view of an apparatus with a battery pack and a sensor configured to detect potential battery pack degradation or imminent failure by indicating when dimensional change beyond a first threshold amount in the battery pack occurs.

FIG. 4A depicts an isometric exploded view of an apparatus with a battery pack and a sensor configured to detect potential battery pack degradation or imminent failure by indicating when dimensional change beyond a first threshold amount in the battery pack occurs. As can be seen, apparatus 400 includes a housing 408, a lid 402, a battery pack 406, and a sensor 404. The lid 402 may have a first interior surface 412 (not directly visible, but corresponding to the underside of the lid as shown). The housing may have a second interior surface 414; an interior compartment may be defined between the first interior surface 412 and the second interior surface 414. The interior compartment may be sized to house the battery pack 406, which may have a nominal length 416, a nominal width 418, and a nominal height 420. The battery pack 406 may also have a first battery pack surface 422 and a second battery pack surface 424 that is opposite the first battery pack surface 422.

Figure 4B:
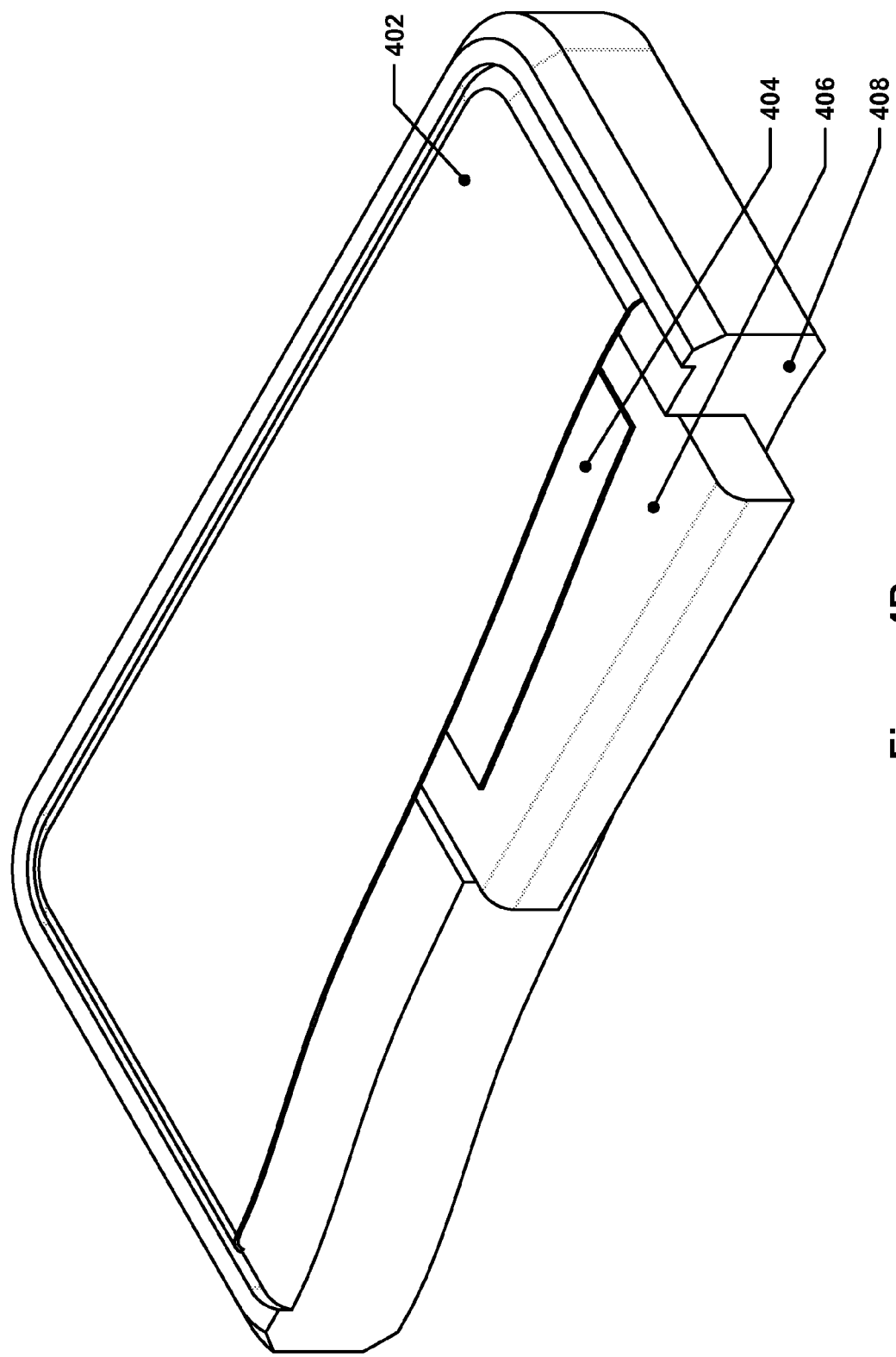
FIG. 4B depicts an isometric cutaway view of the apparatus of FIG. 4A.

FIG. 4B depicts an isometric cutaway view of the apparatus of FIG. 4A. It is to be understood that the various components shown are depicted in a simplified form and omit internal details. Various components depicted are shown with varying portions of material cut away. As can be seen, the battery pack 406 and sensor 404 are relatively constrained in movement, although there is room for the battery pack 406 to expand towards the lid 402.

Figure 4C:
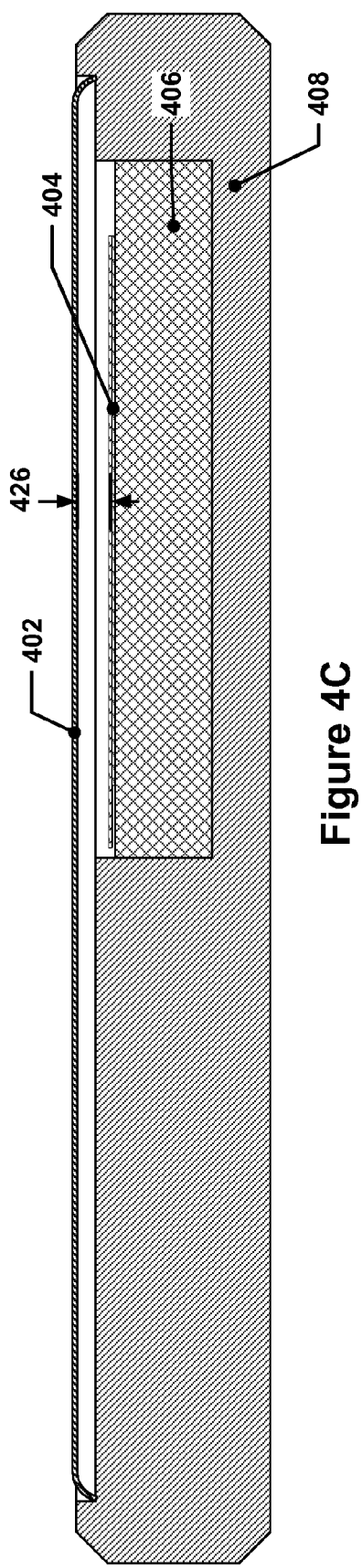
FIG. 4C depicts a side section view of the apparatus of FIG. 4A with the battery pack in a non-degraded condition.

FIG. 4C depicts a side section view of the apparatus of FIG. 4A with the battery pack in a non-degraded condition. As can be seen, a gap 426 exists between the first battery pack surface 422 and the first interior surface 412.

Figure 4D:
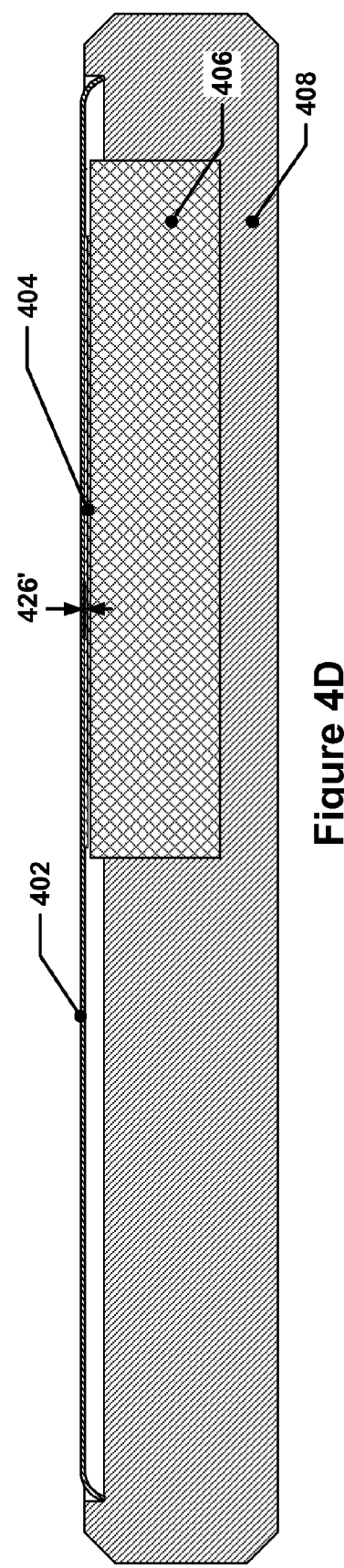
FIG. 4D depicts a side section view of the apparatus of FIG. 4A with the battery pack in a degraded condition.

FIG. 4D depicts a side section view of the apparatus of FIG. 4A with the battery pack in a degraded condition. As can be seen, the gap 426 has decreased to "gap" 426', which is, in this case, a zero gap, i.e., contact between the sensor 404 and the lid 402 has occurred. This contact may cause the sensor 404 to indicate that contact has occurred, and a controller connected with the sensor may then take appropriate action, e.g., provide a notification or take some other action.

Examples of various implementations have been illustrated in the accompanying drawings and described further in the text above. It will be understood that the discussion herein is not intended to limit the claims to the specific implementations described. On the contrary, it is intended to cover alternatives, modifications, and equivalents as may be included within the spirit and scope of the invention as defined by the appended claims. In the preceding description, numerous implementation-specific details have been set forth in order to provide a thorough understanding of the present invention. The present invention may be practiced without some or all of these implementation-specific details. In other instances, well-known process operations have not been described in detail in order not to unnecessarily obscure the present invention.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present disclosure should not be limited by any of the implementations described herein, but should be defined only in accordance with the following and later-submitted claims and their equivalents.

It will be understood that unless features in any of the above-described implementations are expressly identified as incompatible with one another or the surrounding context implies that they are mutually exclusive and not readily combinable in a complementary and/or supportive sense, the totality of this disclosure contemplates and envisions that specific features of those implementations can be selectively combined to provide one or more comprehensive, but slightly different, technical solutions. It will therefore be further appreciated that the above description has been given by way of example only and that modifications in detail may be made within the scope of the disclosure.

What is claimed is:

1. An apparatus comprising:
   a battery pack;
   a housing; and
   a sensor, wherein:
   the battery pack is insertable into the housing, the sensor is configured to generate an output signal that indicates that at least one dimension of the battery pack has increased beyond a first threshold amount, the sensor includes one or more conductive traces and a conductive bridge, a circuit is completed when the one or more conductive traces and the conductive bridge are in physical contact with each other, the one or more conductive traces and the conductive bridge are in physical contact when the at least one dimension of the battery pack increases beyond the first threshold amount while the battery pack is installed in the housing, and at least one of (a) the conductive bridge and (b) the one or more conductive traces are art of the battery pack, and the other of (a) the conductive bridge and (b) the one or more conductive traces are part of the housing.

2. The apparatus of claim 1, wherein the one or more conductive traces are located on an exterior surface of the battery pack and the conductive bridge is located on an interior surface of the housing.

3. The apparatus of claim 2, wherein the housing includes a lid that covers the battery pack and the conductive bridge is located on an interior surface of the housing that is part of the lid.

4. The apparatus of claim 3, wherein the lid is made of an electrically conductive material and the lid is the conductive bridge.

5. The apparatus of claim 1, wherein the one or more conductive traces are located on an interior surface of the housing and the conductive bridge is located on an exterior surface of the battery pack.

6. The apparatus of claim 5, wherein the housing includes a lid that covers the battery pack and the one or more conductive traces are located on an interior surface of the housing that is part of the lid.

7. The apparatus of claim 6, wherein the lid is made of an electrically conductive material and the lid is the one or more conductive traces.

8. The apparatus of claim 1, further comprising an additional sensor configured to generate an additional output signal that indicates that an additional dimension of the battery pack has increased beyond a second threshold amount, wherein the additional dimension is different from the at least one dimension.

9. The apparatus of claim 1, further comprising:
control logic configured to:
 a) receive the output signal from the sensor,
 b) determine, based on the output signal, when the output signal from the sensor indicates that the at least one dimension of the battery pack has increased beyond the first threshold amount, and
 c) generate a first notification responsive to step b).

10. The apparatus of claim 9, wherein the first notification is a message with one or more pieces of content selected from the group consisting of: content indicating that the battery pack is compromised, content indicating that the battery pack is degrading, content indicating that the battery pack is unsafe, content indicating that the battery pack may be unsafe, content indicating that the battery pack needs to be replaced, content indicating an error code, and content indicating that service for the apparatus should be sought.

11. The apparatus of claim 9, further comprising a second sensor, wherein:

the second sensor is configured to generate a second output signal that indicates that the at least one dimension of the battery pack has increased beyond a second threshold amount larger than the first threshold amount, the second sensor includes one or more second conductive traces and a second conductive bridge, another circuit is completed when the one or more second conductive traces and the second conductive bridge are in physical contact with each other, the one or more second conductive traces and the second conductive bridge are in physical contact when the at least one dimension of the battery pack increases beyond the second threshold amount while the battery pack is installed in the housing, and at least one of (a) the second conductive bridge and (b) the one or more second conductive traces are part of the battery pack, and the other of (a) the second conductive bridge and (b) the one or more second conductive traces are part of the housing the control logic is further configured to generate a second notification in response to the generation of the second output signal.

12. The apparatus of claim 9, wherein:
the control logic is configured to send the first notification to a third party in association with information identifying the apparatus or the owner of the apparatus.

13. A method of detecting battery pack degradation, the method comprising:
receiving, by a device, an output signal from a sensor, wherein:
 the sensor is configured to generate the output signal responsive to at least one dimension of a battery pack of the device increasing beyond a first threshold amount,
 the sensor includes one or more conductive traces and a conductive bridge,
 a circuit is completed when the one or more conductive traces and the conductive bridge are in physical contact with each other,
 the one or more conductive traces and the conductive bridge are in physical contact when the at least one dimension of the battery pack increases beyond the first threshold amount while the battery pack is installed in the device, and
 at least one of (a) the conductive bridge and (b) the one or more conductive traces are part of the battery pack, and the other of (a) the conductive bridge and (b) the one or more conductive traces are part of a housing of the device;
determining, by the device, that the output signal from the sensor indicates that the at least one dimension of the battery pack has increased beyond the first threshold amount; and
generating, by the device, a first notification.

14. The method of claim 13, wherein the first notification is a message with one or more pieces of content selected from the group consisting of: content indicating that the battery pack is compromised, content indicating that the battery pack is degrading, content indicating that the battery pack is unsafe, content indicating that the battery pack may be unsafe, content indicating that the battery pack needs to be replaced, content indicating an error code, and content indicating that service for an apparatus containing the battery pack should be sought.

15. The method of claim 13, further comprising sending the first notification to a third party in association with information identifying the device or an owner of the device.

16. The method of claim 13 wherein the at least one dimension is the thickness of the battery pack.

* * * * *

UNITED STATES PATENT AND TRADEMARK OFFICE
CERTIFICATE OF CORRECTION

PATENT NO. : 9,509,020 B1  
APPLICATION NO. : 14/228141  
DATED : November 29, 2016  
INVENTOR(S) : Libo Wang et al.

Page 1 of 1

It is certified that error appears in the above-identified patent and that said Letters Patent is hereby corrected as shown below:

In the Claims

In Claim 1, Line 17 of Column 11, the word "art" should be replaced with "part".

In Claim 11, Line 16 of Column 12, the word "and" at the end of the line should be deleted.

In Claim 11, Line 21 of Column 12, "--, and--" should be added to the end of the line.

Signed and Sealed this  
Second Day of May, 2017

Michelle K. Lee  
*Director of the United States Patent and Trademark Office*